United States Patent
Wu et al.

(10) Patent No.: US 10,684,971 B2
(45) Date of Patent: Jun. 16, 2020

(54) PACKET PROCESSING EFFICIENCY BASED INTERRUPT RATE DETERMINATION

(71) Applicant: VMware, Inc., Palo Alto, CA (US)

(72) Inventors: Shu Wu, Beijing (CN); Michael Li, Beijing (CN); Zongyun Lai, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/352,726

(22) Filed: Mar. 13, 2019

(65) Prior Publication Data

US 2019/0213154 A1 Jul. 11, 2019

Related U.S. Application Data

(63) Continuation of application No. 15/444,546, filed on Feb. 28, 2017, now Pat. No. 10,241,944.

(51) Int. Cl.
*G06F 13/24* (2006.01)
*G06F 9/48* (2006.01)

(52) U.S. Cl.
CPC ............ *G06F 13/24* (2013.01); *G06F 9/4812* (2013.01)

(58) Field of Classification Search
CPC ................................ G06F 13/24; G06F 9/4812
See application file for complete search history.

(56) References Cited

U.S. PATENT DOCUMENTS

| | | |
|---|---|---|
| 6,453,360 B1 | 9/2002 | Muller et al. |
| 6,988,156 B2 | 1/2006 | Musumeci |
| 7,054,972 B2 | 5/2006 | Parry et al. |
| 7,065,598 B2 | 6/2006 | Connor et al. |
| 7,290,076 B2 | 10/2007 | Valenci |
| 8,364,877 B2 | 1/2013 | Mukherjee et al. |
| 8,386,683 B2 | 2/2013 | Hiroki |
| 9,009,367 B2 | 4/2015 | Li et al. |
| 9,455,922 B2 | 9/2016 | Rader |
| 9,697,041 B2 | 7/2017 | Guan et al. |
| 9,921,864 B2 | 3/2018 | Singaravelu et al. |
| 2006/0064529 A1 | 3/2006 | Anand et al. |
| 2006/0236002 A1 | 10/2006 | Valenci |
| 2010/0057967 A1 | 3/2010 | Murakami et al. |
| 2014/0040514 A1 | 2/2014 | Li et al. |
| 2014/0059195 A1 | 2/2014 | Sajeepa |
| 2015/0317179 A1 | 11/2015 | Fahrig et al. |
| 2016/0232115 A1 | 8/2016 | Sawal et al. |

*Primary Examiner* — Brian T Misiura
(74) *Attorney, Agent, or Firm* — Patterson + Sheridan, LLP

(57) ABSTRACT

Interrupt rate determination can include instructions to determine a quantity of instances of packet processing by an operating system during a first period of time, each instance corresponding to a particular interrupt request sent by a device, determine a quantity of bytes processed during the first period of time by the operating system, determine a speed of the device, determine a first interrupt rate to assign to the device for a second period of time based on the quantity of instances, the quantity of bytes processed, and the speed of the device during the first period of time, and set the interrupt rate to the device.

18 Claims, 6 Drawing Sheets

PACKET PROCESSING EFFICIENCY BASED INTERRUPT RATE DETERMINATION

RELATED APPLICATIONS

This application is a continuation of U.S. patent application Ser. No. 15/444,546 filed on Feb. 28, 2017, the contents of which are incorporated herein by reference.

BACKGROUND

Operating systems may utilize an interrupt rate in order to improve performance (e.g., throughput and/or Central Processing Unit (CPU) utilization). A moderately throttled interrupt rate, for instance, may reduce CPU overhead while preserving on-par data throughput and/or latency with un-throttled interrupts.

Previous approaches to determining an interrupt rate may be based on data throughput in a networking adapter, for instance. These approaches may produce fixed interrupt rates narrowly tailored for one specific computing capacity host and therefore not broadly applicable to different hosts having different computing capacities.

DETAILED DESCRIPTION

Figure 1:
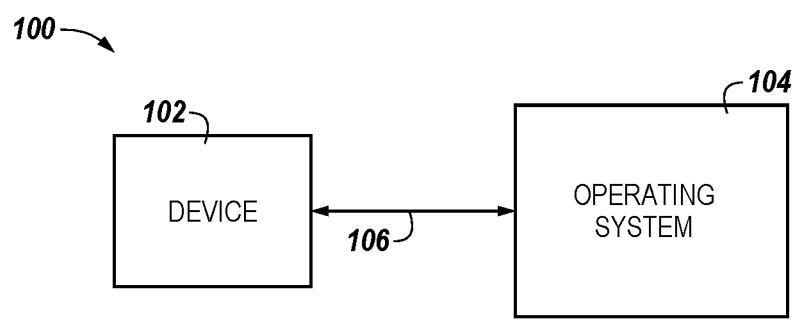
FIG. 1 is a diagram of a system for interrupt rate determination according to the present disclosure.

An operating system may poll a device driver for statistical data to improve CPU utilization by reducing interrupt numbers. Embodiments of the present disclosure can leverage statistical data gained by polling to determine and program a moderate interrupt rate to a device (e.g., hardware and/or virtualized hardware). Accordingly, embodiments herein can throttle the number of interrupts needed to achieve on-par throughput and latency. A reduction in the interrupt rate can yield a reduction in CPU cost.

The present disclosure includes embodiments that leverage statistical data from an operating system while it is running, thereby reflecting its current computing capacity rather than an outdated computing capacity. Moreover, receiving data from a running operating system makes embodiments herein widely applicable to different hosts having different computing capacities. Embodiments herein can provide performance advantages in both high and low-throughput environments, and for both small and large packet sizes.

In some embodiments, an interrupt rate can be determined based on a determined efficiency of packet processing. When packet processing efficiency is increased, packets may be processed for longer durations. When packet processing efficiency is reduced, packets may be processed for shorter durations. Packet processing efficiency can depend on hardware capacity (e.g., CPU speed, cache, memory bandwidth, bus bandwidth, network interface card (NIC) hardware, etc.). Because embodiments herein can react to changing hardware environments, improvements may be realized over previous approaches using throughput-based methods and/or packet-size-based methods that output fixed values for interrupt rate(s).

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 426 may reference element "26" in FIG. 4, and a similar element may be referenced as 526 in FIG. 5. A group or plurality of similar elements or components may generally be referred to herein with a single element number. For example a plurality of reference elements 442-1, 442-2, . . . , 442-N may be referred to generally as 442. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a system 100 for interrupt rate determination according to the present disclosure. The system 100 can include a device 102 in communication with an operating system (OS) 104 via a communication path 106. The device 102 is a device capable of sending an interrupt request to the OS. The device 102 (e.g., a network device) is a device capable of transmitting and receiving packets of data via the communication path 106. For example, the device 102 can be a network adapter, which can also be referred to as a Network Interface Card (NIC), Input/Output (I/O) device, virtual computing instance (VCI), etc. The communication path 106 can be local or remote to the OS 104 and/or the device 102. Examples of a local communication path 106 can include an electronic bus internal to a machine. Examples of such electronic buses can include Industry Standard Architecture (ISA), Peripheral Component Interconnect (PCI), Advanced Technology Attachment (ATA), Small Computer System Interface (SCSI), Universal Serial Bus (USB), System Management Bus (SMBus), among other types of electronic buses and variants thereof. The communication path 106 can be such that the operating system 104 is remote from the device 102, such as in a network connection between the operating system 104 and the device 102. That is, the communication path 106 can be a network connection. Examples of such a network connection can include a local area network (LAN), wide area network (WAN), personal area network (PAN), and the Internet, among others.

Though not illustrated in FIG. 1, the system 100 can include a non-transitory machine-readable medium having instructions stored thereon which, when executed by processing resources, cause the processing resources to perform a number of functions described herein. In some embodiments, the medium can exist as an entity external to the operating system 104, such as an application, process, or driver. In some embodiments, the medium can exist within the operating system 104 (e.g., as an application and/or driver hosted by the operating system 104).

The operating system 104 can use a two-step procedure to process network packets. The first step, which may be referred to as the "top half," includes a system interrupt handler. The top half can be triggered by the reception of interrupts transmitted (e.g., asserted) by the device 102 when a packet is received and/or transmitted. The top half can disable device interrupt to prevent interrupts from initiating (e.g., re-entering) and can notify the second step to run in a different context before terminating (e.g., exiting).

The second step, which may be referred to as the "bottom half," can run in a relatively lower priority than the top half and can hold CPU resources longer. The bottom half can work in a loop, checking and processing packets until no more packets are pending (e.g., unprocessed). Before terminating the bottom half can re-enable device interrupt so that the top half can run again when the device 102 receives and/or transmits additional packets.

Figure 2:
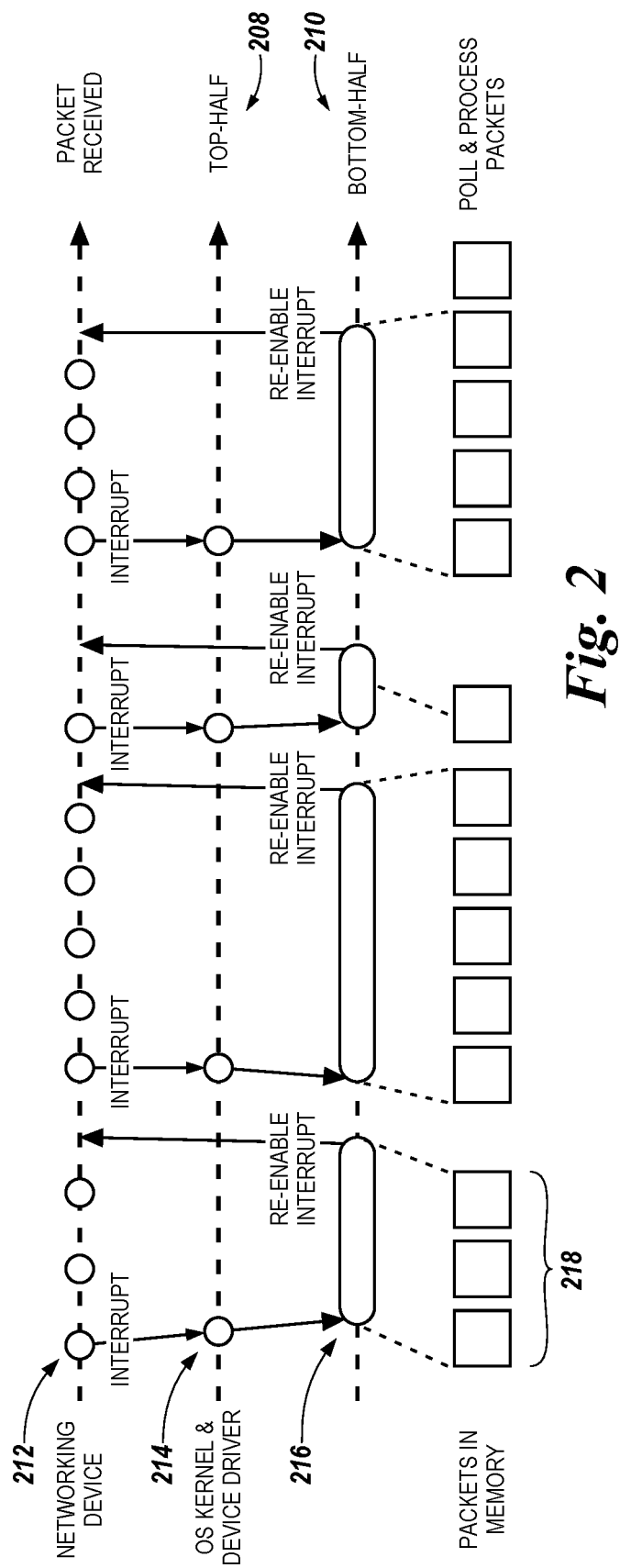
FIG. 2 illustrates a timing sequence without interrupt throttling.

FIG. 2 illustrates a timing sequence without interrupt throttling. As shown in FIG. 2, a packet 212 can be received from a device (e.g., the device 102, previously described in connection with FIG. 1). The device can transmit an interrupt 214 to the top half 208. The bottom half 210 can poll for packets from the device and process them (e.g., for operating system kernel). The bottom half 210 can run until no pending packets are received from, or transmitted to, the device. As shown in the example illustrated in FIG. 2, the packet 212 and two additional packets are processed in an instance of packet processing 216 (hereinafter, "processing instance") by the bottom half 210 and stored in memory at 218. When no pending packets are received from, or transmitted to, the device, the bottom half 210 can re-enable the interrupt.

Under heavy traffic, the bottom half 210 can run for a longer period of time processing more packets. Under light traffic, the bottom half 210 can run for a shorter period of time, where a greater proportion of time may be spent by the bottom half 210 waiting for the reception of another interrupt to activate the top half 208.

In some instances, the bottom half 210 may poll and/or process fewer packets than expected. For example, the bottom half may run faster than the device receiving and/or transmitting packets. This may be the case if packets are relatively large, and/or if the host CPU is faster than the speed of the device. In these instances, the CPU may frequently switch between different contexts (e.g., top half and bottom half), thereby diminishing performance.

To resolve performance issues associated with heavy traffic, interrupts can be throttled. In some embodiments, when packets are received and/or transmitted by the device, and an interrupt is ready to transmit, the transmission of the interrupt is delayed. During the delay, additional packets may be received and/or transmitted by the device. Then, in a subsequent processing instance by the bottom half 210, an increased quantity of packets can be processed. Throttling interrupts can reduce a quantity of interrupts transmitted in a given period of time, and reduce CPU utilization by reducing a quantity of switches between the top half 208 and the bottom half 210.

Figure 3:
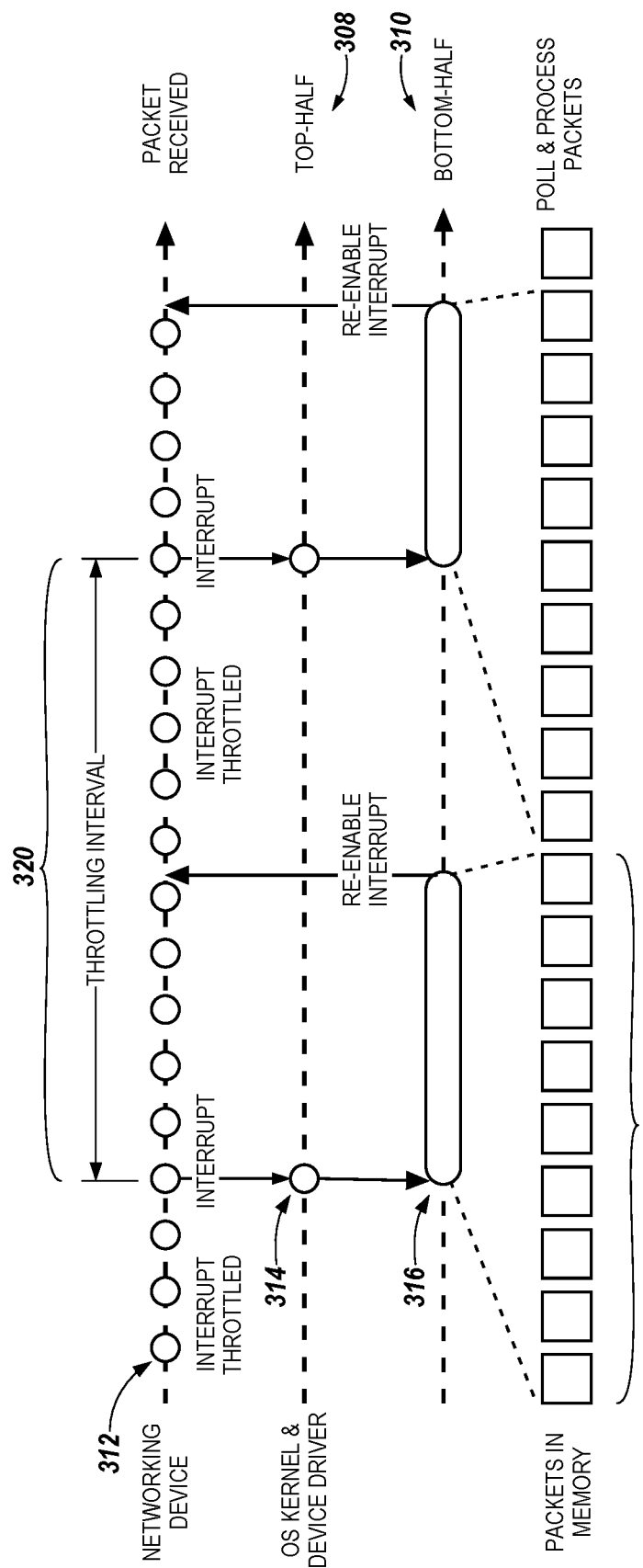
FIG. 3 illustrates a timing sequence with an interrupt in accordance with the present disclosure.

FIG. 3 illustrates a timing sequence with an interrupt in accordance with the present disclosure. In contrast to the example illustrated in FIG. 2, the device in FIG. 3 does not issue an interrupt 314 at the time of packet 312 reception/transmission. Instead, interrupts 314 are throttled. After a period of time, referred to as a "throttling interval" 320, an interrupt is issued by the device and received by the top half 308. The throttling interval 320 can be measured in units of time, such as nanoseconds or microseconds. Reciprocally, an "interrupt rate" can be measured in a quantity of interrupts issued and/or received in a period of time (e.g., one second). As shown in FIG. 3, fewer contextual changes between the top half 308 and the bottom half 310 are made with the application of the throttling interval 320. The bottom half 310 can have an increased quantity of packets to process into memory 318. However, if the throttling interval exceeds a time threshold (e.g., is too long), latencies can result.

Figure 4:
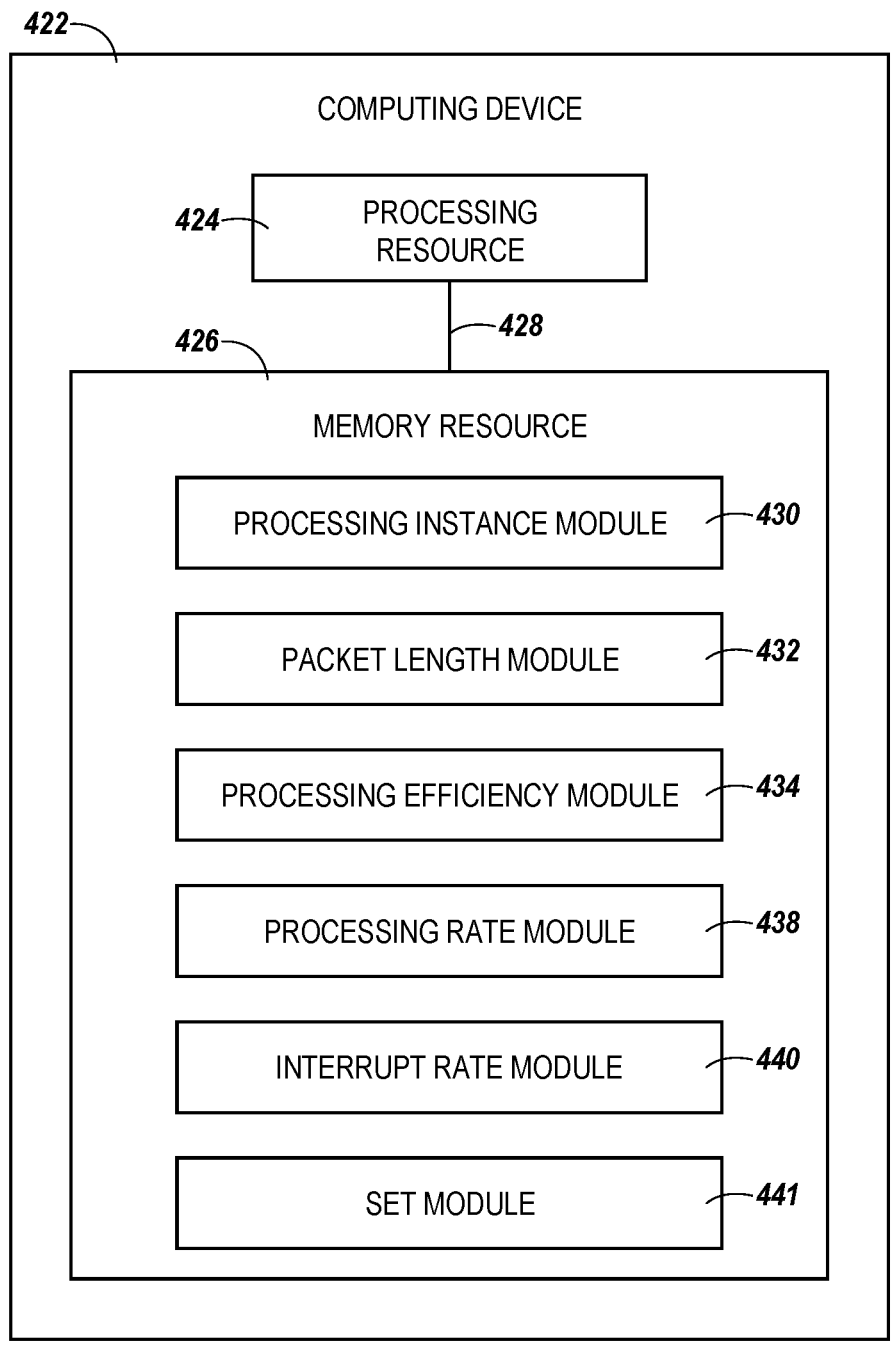
FIG. 4 is a diagram of a computing device for interrupt rate determination according to the present disclosure.

FIG. 4 is a diagram of a computing device 422 for interrupt rate determination according to the present disclosure. In some embodiments the computing device 422 can include an operating system analogous to the operating system 104, previously described in connection with FIG. 1. The computing device 422 can utilize software, hardware, firmware, and/or logic to perform a number of functions. The computing device 422 can be a combination of hardware and program instructions configured to perform a number of functions (e.g., actions). The hardware, for example, can include a number of processing resources 424 and a number of memory resources 426, such as a machine-readable medium (MRM) or other memory resources 426. The memory resources 426 can be internal and/or external to the computing device 422 (e.g., the computing device 422 can include internal memory resources and have access to external memory resources). In some embodiments, the computing device 422 can be a management server, for example, analogous to the management server 658, discussed below in connection with FIG. 6. The program instructions (e.g., machine-readable instructions (MM)) can include instructions stored on the MRM to implement a particular function (e.g., an action such as determining a quantity of bytes processed during a period of time). The set of MRI can be executable by one or more of the processing resources 424. The memory resources 426 can be coupled to the computing device 422 in a wired and/or wireless manner. For example, the memory resources 426 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

The memory resources 426 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 424 can be coupled to the memory resources 426 via a communication path 428. The communication path 428 can be local or remote to the computing device 422. Examples of a local communication path 428 can include an electronic bus internal to a machine, where the memory resources 426 are in communication with the processing resources 424 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 428 can be such that the memory resources 4265 are remote from the processing resources 424, such as in a network connection between the memory resources 426 and the processing resources 424. That is, the communication path 428 can be a network connection. Examples of such a network connection can include a local area network (LAN), wide area network (WAN), personal area network (PAN), and the Internet, among others.

As shown in FIG. 4, the MRI stored in the memory resources 426 can be segmented into a number of modules 430, 432, 434, 436, 438, 440 that, when executed by the processing resources 424, can perform a number of functions. As used herein a module includes a set of instructions executed to perform a particular task or action. The number of modules 430, 432, 434, 436, 438, 440, can be sub-modules of other modules. For example, the processing instance module 430 can be a sub-module of the byte quantity module 432 and/or can be contained within a single module. Furthermore, the number of modules 430, 432, 434, 436, 438, 440, can comprise individual modules separate and distinct from one another. Examples are not limited to the specific modules 430, 432, 434, 436, 438, 440, illustrated in FIG. 4.

The processing instance module 430 can include instructions to determine a quantity of instances of packet processing by an operating system during a period of time, each instance corresponding to a particular interrupt request sent by a device. An instance of packet processing can be temporally defined by a reception of an interrupt by a bottom half (e.g., a beginning) and the re-enablement of the interrupt (e.g., an end). For example, instances of packet processing are illustrated in FIGS. 2 and 3 as processing instance 216 and processing instance 316, respectively. The period of time can be a period of time during which the quantity of processing instances by the operating system exceeds a quantity threshold.

The packet length module 432 can include instructions to determine a quantity of bytes processed over the period of time by the operating system. The length can be represented by a byte length of the packets processed in each processing instance.

The processing efficiency module can include instructions to determine a packet processing efficiency for the period of time based on the quantity of instances and the quantity of bytes processed. The processing efficiency can refer to an average number of bytes processed for each processing instance.

The processing rate module 438 can include instructions to determine a packet processing rate for the period of time based on a speed of the device and the packet processing efficiency. The packet processing rate can refer to a quantity of processing instances performed each second, for instance. The speed of the device can refer a maximum speed at which the device is configured to operate (e.g., a rated capable speed of the device). The speed of the device can be represented in bytes per second, for instance. For a NIC having a speed of 1000 megabits per second, device speed can be 125,000,000 bytes per second.

The packet processing rate can be equivalent to the device speed divided by the packet processing efficiency. The packet processing rate can be equivalent to the device speed multiplied by the quantity of processing instances divided by a sum of the quantity of bytes processed in each processing instance during the period of time.

The interrupt rate module 440 can include instructions to determine an interrupt rate for the period of time based on the packet processing rate and a coefficient corresponding to a processing delay time. In some embodiments, the interrupt rate can be determined from multiplying the packet processing rate with the coefficient. The coefficient can account for the processing delay time, which can be considered to be a portion of the period of time corresponding to an initiation delay and a termination delay for each processing instance by the operating system during the period of time. The coefficient can reconcile theoretical time durations with practical time durations, such as those lengthened due to processing instances initiating and/or terminating, for instance. The set module 441 can include instructions to set the interrupt rate to the device.

In some embodiments, the instructions can include instructions to reduce the determined interrupt rate to a first value responsive to the determined interrupt rate exceeding the first value. Stated in another way, embodiments herein can set a first (e.g., maximum) threshold for the determined interrupt rate. Such a threshold may be determined based on device speed. For example, for a 1000 megabits per second capable NIC, the first threshold may be set at approximately 20,000; for a 10 gigabits per second NIC, the first threshold may be set at approximately 100,000.

In some embodiments, the instructions can include instructions to increase the determined interrupt rate to a second value responsive to the determined interrupt rate being less than the second value. Stated in another way, embodiments herein can set a second (e.g., minimum) threshold for the determined interrupt rate. The second threshold can be determined based on a permitted latency, which may be governed by a type of network traffic. For example, for a heavy and/or large packet traffic with 200 microseconds of permitted latency, the second threshold may be set at 5,000 (e.g., $1/200 \times 10^{-6}$).

Expressed differently, if numPolls represents the quantity of processing instances, numBytes represents the byte length (in number of bytes) of each packet processed by a corresponding processing instance, L represents device speed, C represents the coefficient, maxIntrRate represents the first (e.g., maximum) threshold, and minIntrRate represents the second (e.g., minimum) threshold, the interrupt rate I can be determined by the following:

$$I = \text{MAX}\left(\text{MIN}\left(C \times L \times \frac{numPolls}{numBytes}, \text{max}IntrRate\right), \text{min}IntrRate\right)$$

The instructions can include instructions to set and/or assign the interrupt rate to the device. The device can use the determined interrupt that it was assigned for a subsequent time period sequentially following the first time period. In some embodiments, the interrupt rate can be determined and the second time period can begin responsive to the quantity of processing instances exceeding a quantity threshold during the first period of time.

Thereafter, embodiments herein can determine a quantity of instances of packet processing by the operating system during the second period of time, determine a quantity of bytes processed during the second period of time by the operating system, and determine a second interrupt rate to assign to the device for a third period of time based on the quantity of instances, the quantity of bytes processed, and the speed of the device during the second period of time, in a manner analogous to that previously discussed during the first period of time.

Figure 5:
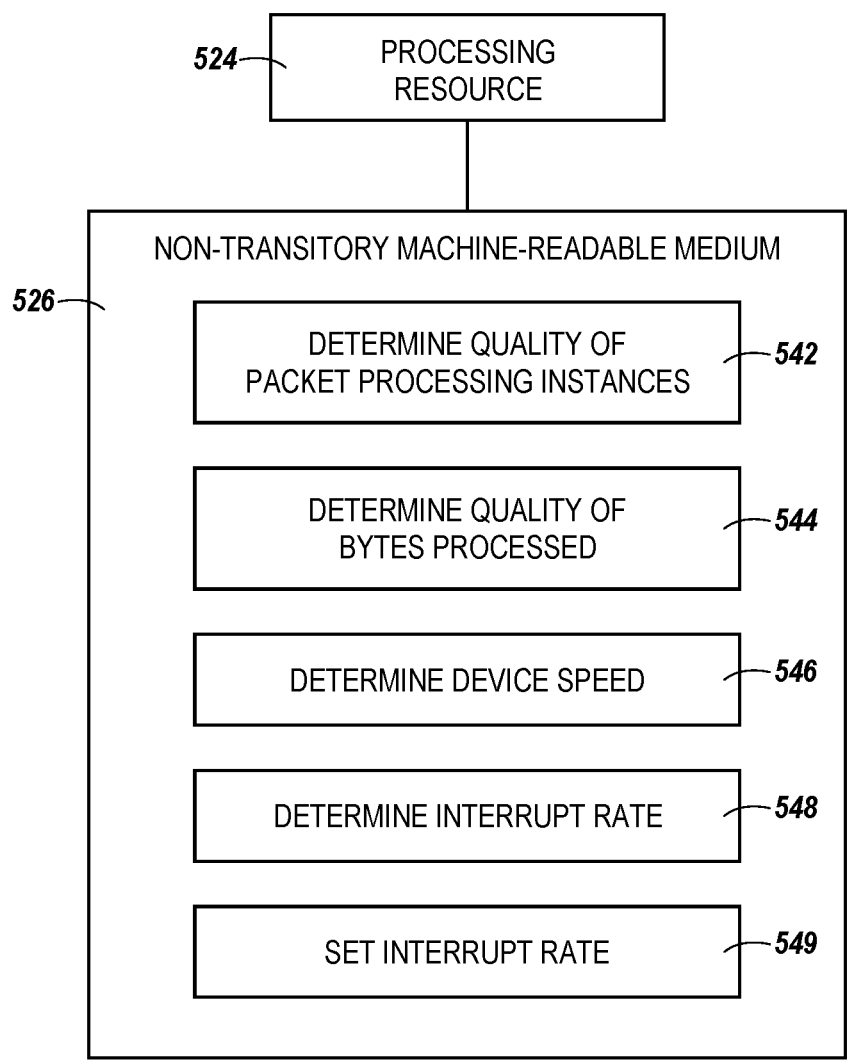
FIG. 5 illustrates a non-transitory machine readable medium for interrupt rate determination according to the present disclosure.

FIG. 5 illustrates a non-transitory machine readable medium 526 for interrupt rate determination according to the present disclosure. The medium 526 can be part of a machine that includes a processing resource 524. The processing resource 524 can be configured to execute instructions stored on the non-transitory machine readable medium 526. For example, the non-transitory machine readable medium 526 can be any type of volatile or non-volatile memory or storage, such as random access memory (RAM), flash memory, read-only memory (ROM), storage volumes, a hard disk, or a combination thereof. When executed, the instructions can cause the processing resource 524 to provide interrupt rate determination. The instructions can comprise a driver for the device, and, as previously discussed, the device can be a network interface card, for instance.

The medium 526 can store instructions 542 executable by the processing resource 524 to determine a quantity of instances of packet processing by an operating system during a first period of time, each instance corresponding to a particular interrupt request sent by a device. The medium 526 can store instructions 542 executable by the processing resource 524 to determine a quantity of bytes processed during the first period of time by the operating system. The medium 526 can store instructions 542 executable by the processing resource 524 to determine a speed of the device. The medium 526 can store instructions 542 executable by the processing resource 524 to determine a first interrupt rate to assign to the device for a second period of time based on the quantity of instances, the quantity of bytes processed, and the speed of the device during the first period of time. The medium 526 can store instructions 549 executable by the processing resource 524 to set the interrupt rate to the device.

Figure 6:
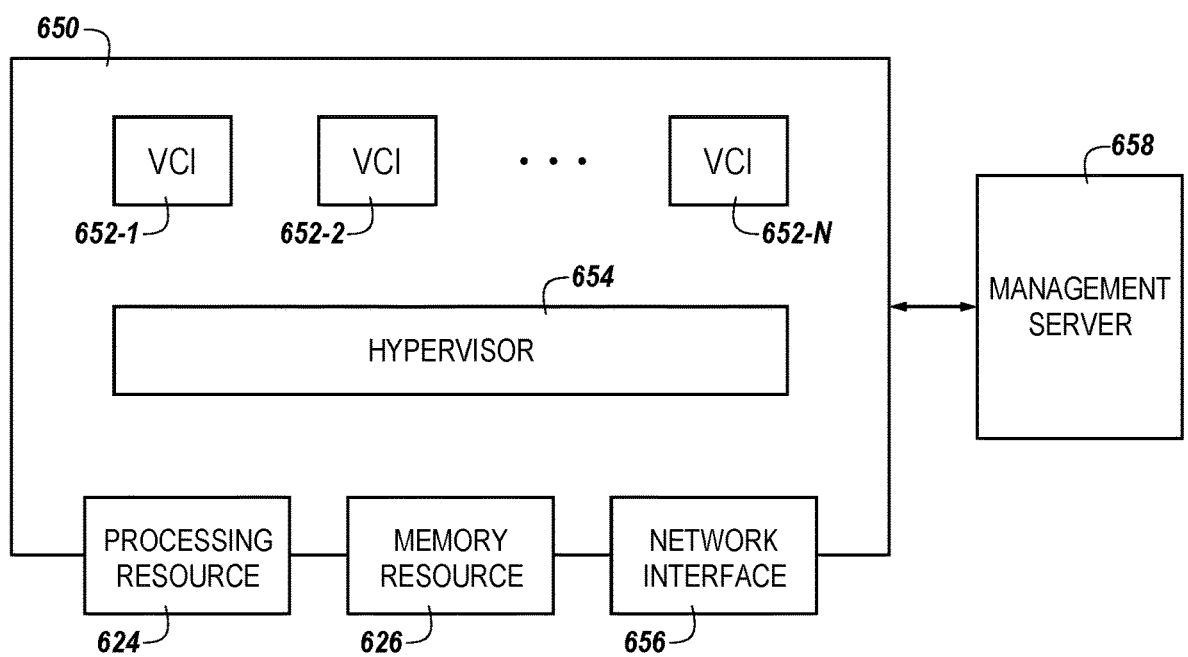
FIG. 6 is a diagram of a host for interrupt rate determination according to the present disclosure.

FIG. 6 is a diagram of a host for interrupt rate determination according to the present disclosure. It is noted that embodiments of the present disclosure are not limited to the host 650 illustrated in FIG. 6; as previously discussed, interrupt rates can be determined in other environments. The host 650 can include processing resources 624 (e.g., a number of processors), memory resources 626, and/or a network interface 656. Memory resources 626 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 626 may comprise primary and/or secondary storage.

The host 650 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

As previously discussed, a device for which an interrupt rate is determined, as referred to herein, can be a virtual computing instance (VCI) in some embodiments, which covers a range of computing functionality. VCIs may include non-virtualized physical hosts, virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.).

Multiple VCIs can be configured to be in communication with each other in a software defined data center. In such a system, information can be propagated from an end user to at least one of the VCIs in the system, between VCIs in the system, and/or between at least one of the VCIs in the system and a management server. In some embodiments, the management server can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

The host 650 can incorporate a hypervisor 654 that can execute a number of VCIs 652-1, 652-2, . . . , 652-N that can, in some embodiments, each provide the functionality of a device, as previously discussed. The VCIs 652-1, 652-2, . . . , 652-N are referred to generally herein as "VCIs 652." The VCIs 652 can be provisioned with processing resources 624 and/or memory resources 626 and can communicate via the network interface 656. The processing resources 624 and the memory resources 626 provisioned to the VCIs 652 can be local and/or remote to the host 650. For example, in a software defined data center, the VCIs 652 can be provisioned with resources that are generally available to the software defined data center and are not tied to any particular hardware device. By way of example, the memory resources 626 can include volatile and/or non-volatile memory available to the VCIs 652. The VCIs 652 can be moved to different hosts (not specifically illustrated), such that different hypervisors manage the VCIs 652. In some embodiments, a VCI among the number of VCIs 652 can be a master VCI. For example, VCI 652-1 can be a master VCI, and VCIs 652-2, . . . 652-N can be slave VCIs. The host 650 can be in communication with a management server 658. In some embodiments, the management server 658 can include a combination of software and hardware, or the management server 658 can include software and can be provisioned by the processing resource 624.

Methods of determining interrupt rates in accordance with embodiments herein can be carried out by a computing device, for instance, in combination with one or more hardware devices. Executable instructions and/or logic defining such methods can include determining a quantity of instances of packet processing by an operating system during a period of time, each instance corresponding to a particular interrupt request sent by a device. Methods can include determining a quantity of bytes processed for a corresponding instance during the period of time. Determining an interrupt rate to assign to the device for a subsequent period of time responsive to the quantity of instances exceeding a quantity threshold can include determining a packet processing efficiency based on the quantity of instances and the respective lengths, determining a speed of the device, determining a packet processing rate based on the speed of the device and the packet processing efficiency, determining an interrupt rate based on the packet processing rate and a coefficient corresponding to a processing delay time, and modifying the determined interrupt rate responsive to the determined interrupt rate exceeding a threshold.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    determining a quantity of instances of packet processing by an operating system during a first period of time, each instance corresponding to a particular interrupt request sent by a device;
    determining a quantity of bytes processed during the first period of time by the operating system;
    determining a speed of the device;
    determining a first interrupt rate to assign to the device for a second period of time based on the quantity of instances, the quantity of bytes processed, the speed of the device during the first period of time, and a coefficient corresponding to a processing delay time during the first period of time, wherein the processing delay time represents at least an initiation delay and termination delay for packet processing by the operating system during the first period of time; and
    setting the interrupt rate to the device.

2. The method of claim 1, wherein the method includes determining a rated capable speed of the device.

3. The method of claim 1, wherein the second period of time sequentially follows the first period of time.

4. The method of claim 1, wherein the method includes beginning the second period of time responsive to the quantity of instances of packet processing by the operating system exceeding a quantity threshold during the first period of time.

5. The method of claim 1, wherein the method includes:
    determining a quantity of instances of packet processing by the operating system during the second period of time;
    determining a quantity of bytes processed by the operating system during the second period of time; and
    determining a second interrupt rate to assign to the device for a third period of time based on the quantity of instances, the quantity of bytes processed, and the speed of the device during the second period of time.

6. The method of claim 5, wherein the method includes beginning the third period of time responsive to the quantity of instances of packet processing by the operating system exceeding a quantity threshold during the second period of time.

7. The method of claim 1, wherein the device comprises a network interface card.

8. The method of claim 1, wherein the method includes determining the interrupt rate according to the expression:

$$\text{MAX}\left(\text{MIN}\left(C \times L \times \frac{numPolls}{numBytes}, maxIntrRate\right), minIntrRate\right)$$

wherein:
    numPolls represents the quantity of instances of packet processing,
    numBytes represents a quantity of bytes processed during each of the instances of packet processing,
    L represents the speed of the device,
    C represents a coefficient corresponding to the processing delay time,
    minIntrRate represents a minimum limit associated with the interrupt rate.

9. A system, comprising:
    a processing resource; and
    a memory storing instructions which, when executed by the processing resource, cause the processing resource to:
        determine a quantity of instances of packet processing by an operating system during a period of time, each instance corresponding to a particular interrupt request sent by a device;
        determine a quantity of bytes processed over the period of time by the operating system;
        determine a packet processing efficiency for the period of time based on the quantity of instances and the quantity of bytes processed;
        determine a packet processing rate for the period of time based on a speed of the device and the packet processing efficiency, wherein determining the packet processing rate includes multiplying the speed of the device by the quantity of instances of packet processing divided by a sum of the respective lengths of each packet processed by the corresponding instance;

determine an interrupt rate for the period of time based on the packet processing rate and a coefficient corresponding to a processing delay time; and set the interrupt rate to the device.

10. The system of claim 9, wherein the packet processing rate is a quantity of instances of packet processing by the operating system per unit time.

11. The system of claim 9, wherein the instructions to determine the packet processing rate include instructions to divide the speed of the device by the determined packet processing efficiency.

12. The system of claim 9, wherein the processing delay time represents a cumulative initiation delay and termination delay for packet processing by the operating system during the period of time.

13. The system of claim 9, wherein the device is a virtual computing instance.

14. A non-transitory machine-readable medium storing instructions which, when executed by a processing resource, cause the processing resource to:

determine a quantity of instances of packet processing by an operating system during a period of time, each instance corresponding to a particular interrupt request sent by a device;

determine a quantity of bytes processed for a corresponding instance during the period of time; and determine an interrupt rate to assign to the device for a subsequent period of time responsive to the quantity of instances exceeding a quantity threshold, wherein the instructions to determine the interrupt rate include instructions to:

determine a packet processing efficiency based on the quantity of instances and the respective lengths;

determine a speed of the device;

determine a packet processing rate based on the speed of the device and the packet processing efficiency;

determine an interrupt rate based on the packet processing rate and a coefficient corresponding to a processing delay time;

determine that the determined interrupt rate exceeds a threshold; and modify the determined interrupt rate responsive to the determined interrupt rate exceeding the threshold, wherein the instructions to determine that the interrupt rate exceeds the threshold include instructions to determine that the interrupt rate is less than a value, and wherein the instructions to modify the determined interrupt rate include instructions to increase the interrupt rate to the value.

15. The medium of claim 14, including instructions to set the value to 20,000 interrupts per second when if the speed of the device is 1000 megabits per second.

16. The medium of claim 14, including instructions to set the value to 100,000 interrupts per second if the speed of the device is 10 Gigabits per second.

17. The medium of claim 14, including instructions to determine the value based on a permitted latency.

18. The medium of claim 17, including instructions to set the value to 5,000 interrupts per second based on a 200 microsecond permitted latency.

* * * * *

UNITED STATES PATENT AND TRADEMARK OFFICE
CERTIFICATE OF CORRECTION

| | | |
|---|---|---|
| PATENT NO. | : 10,684,971 B2 | |
| APPLICATION NO. | : 16/352726 | |
| DATED | : June 16, 2020 | |
| INVENTOR(S) | : Shu Wu et al. | |

It is certified that error appears in the above-identified patent and that said Letters Patent is hereby corrected as shown below:

In the Specification

Column 4; Line 39: (MM should read (MRI

Signed and Sealed this
Seventeenth Day of September, 2024

Katherine Kelly Vidal
*Director of the United States Patent and Trademark Office*